US011842103B2

(12) United States Patent
Nakamura

(10) Patent No.: US 11,842,103 B2
(45) Date of Patent: Dec. 12, 2023

(54) PRINTING APPARATUS THAT TRANSMITS ITS ADDRESS TO AN EXTERNAL APPARATUS USING A WIRELESS COMMUNICATION PACKET, METHOD FOR CONTROLLING THE PRINTING APPARATUS, AND RECORDING MEDIUM THEREOF

(71) Applicant: CANON KABUSHIKI KAISHA, Tokyo (JP)

(72) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/404,903

(22) Filed: Aug. 17, 2021

(65) Prior Publication Data

US 2021/0373825 A1   Dec. 2, 2021

Related U.S. Application Data

(63) Continuation of application No. 16/684,331, filed on Nov. 14, 2019, now Pat. No. 11,119,711, which is a continuation of application No. 15/819,469, filed on Nov. 21, 2017, now Pat. No. 10,489,094.

(30) Foreign Application Priority Data

Nov. 29, 2016  (JP) ................................. 2016-230830

(51) Int. Cl.
*H04W 4/06* (2009.01)
*G06F 3/12* (2006.01)
*H04W 4/80* (2018.01)
*H04W 8/00* (2009.01)
*H04L 61/5007* (2022.01)
*H04L 101/659* (2022.01)

(52) U.S. Cl.
CPC .......... *G06F 3/1236* (2013.01); *G06F 3/1203* (2013.01); *G06F 3/1231* (2013.01); *G06F 3/1292* (2013.01); *H04W 4/80* (2018.02); *G06F 3/1221* (2013.01); *H04L 61/5007* (2022.05); *H04L 2101/659* (2022.05); *H04W 8/005* (2013.01)

(58) Field of Classification Search
CPC .... G06F 3/1236; G06F 3/1203; G06F 3/1231; G06F 3/1292; H04W 4/80; H04W 8/005; H04W 40/246; H04W 40/24; H04L 61/2007; H04L 61/6059
USPC ...................................................... 358/1.15
See application file for complete search history.

(56) References Cited

U.S. PATENT DOCUMENTS

| 2005/0128968 A1* | 6/2005 | Yang ..................... H04W 48/16 370/312 |
| 2012/0113459 A1* | 5/2012 | Williams ............... G06F 3/1206 358/1.15 |
| 2016/0020861 A1* | 1/2016 | Jin ........................ H04W 4/023 455/456.1 |
| 2016/0026417 A1* | 1/2016 | Inoue .................... G06F 3/1206 358/1.15 |

(Continued)

*Primary Examiner* — Jamares Q Washington
(74) *Attorney, Agent, or Firm* — Canon U.S.A., Inc. IP Division

(57) ABSTRACT

In a case where both an IPv4 address and an IPv6 address are available in a printing apparatus, a Bluetooth low energy advertising packet including the available IPv4 address but not the available IPv6 address is generated and periodically transmitted.

18 Claims, 4 Drawing Sheets

(56) References Cited

U.S. PATENT DOCUMENTS

| | | | | |
|---|---|---|---|---|
| 2016/0057101 A1* | 2/2016 | Hugard, IV | ........ | H04L 61/1541 |
| | | | | 709/220 |
| 2016/0065551 A1* | 3/2016 | Huang | .................. | H04L 63/102 |
| | | | | 726/7 |
| 2016/0112951 A1* | 4/2016 | Batra | ...................... | H04L 69/08 |
| | | | | 370/311 |
| 2017/0134609 A1* | 5/2017 | Park | ................... | H04N 1/32776 |

* cited by examiner

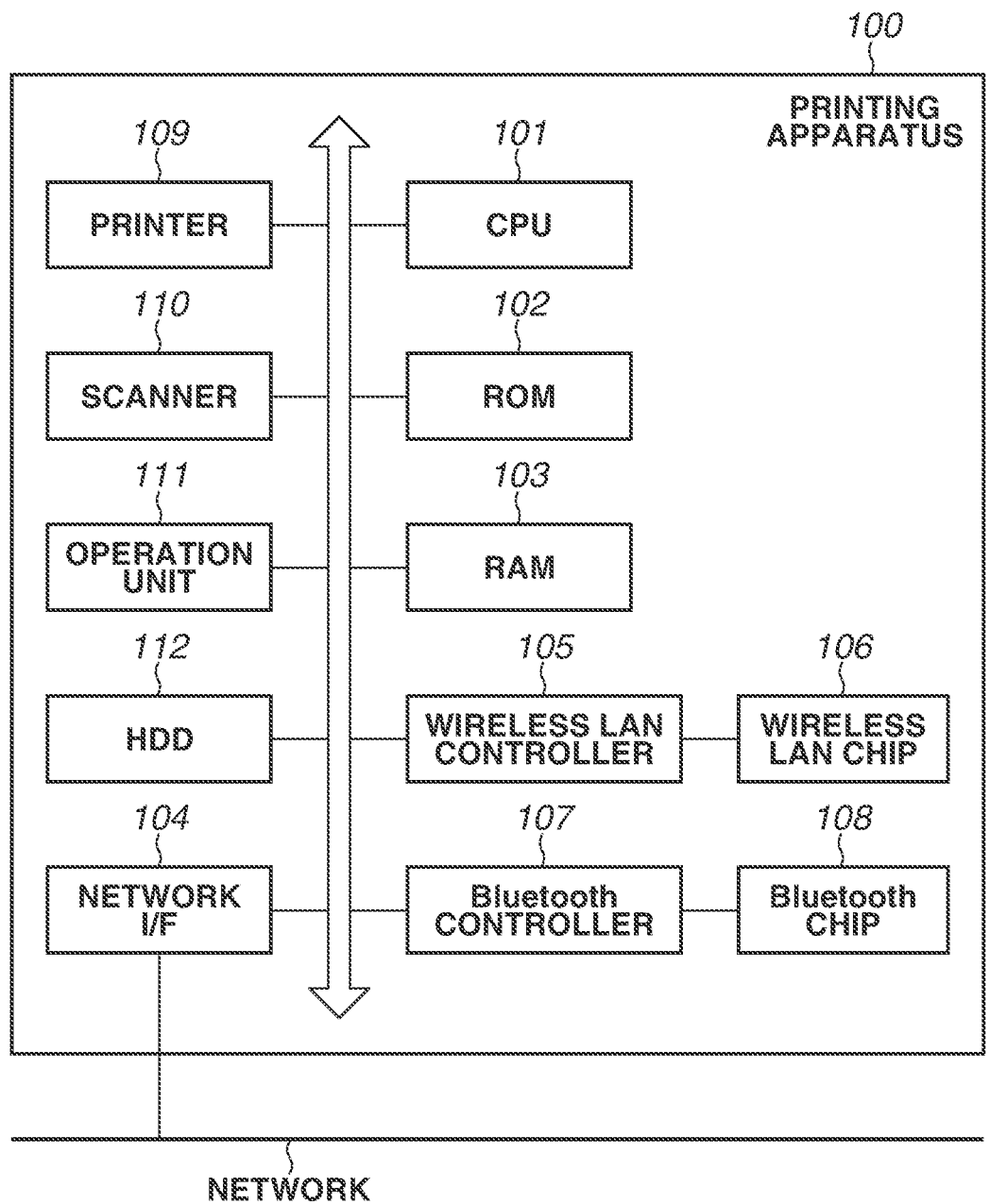

FIG.2A

| HEADER | CONNECTION INFORMATION | SERVER OR RESOURCE PATH | PORT | IP ADDRESS | TX POWER |

FIG.2B

| HEADER | TX POWER | MAC ADDRESS | DEVICE NAME | DEVICE CATEGORY |

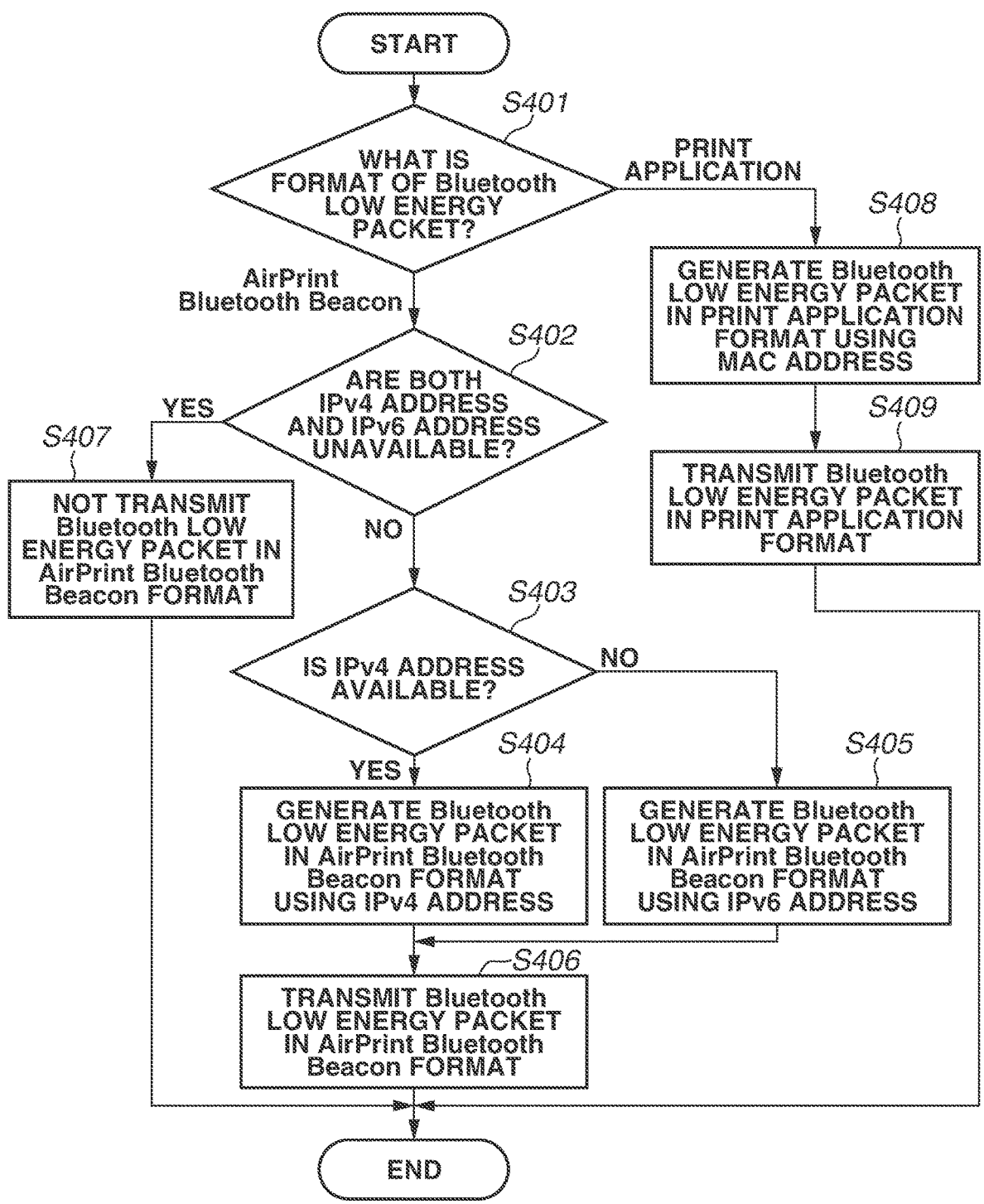

PRINTING APPARATUS THAT TRANSMITS ITS ADDRESS TO AN EXTERNAL APPARATUS USING A WIRELESS COMMUNICATION PACKET, METHOD FOR CONTROLLING THE PRINTING APPARATUS, AND RECORDING MEDIUM THEREOF

CROSS-REFERENCE TO RELATED APPLICATIONS

This is a continuation of U.S. patent application Ser. No. 16/684,331 filed on Nov. 14, 2019 which is a continuation of U.S. patent application Ser. No. 15/819,469 filed on Nov. 21, 2017 (issued as U.S. Pat. No. 10,489,094 on Nov. 26, 2019), which claims the benefit of Japanese Patent Application No. 2016-230830, filed Nov. 29, 2016, both of which are hereby incorporated by reference herein in their entireties.

BACKGROUND

Field

The present disclosure relates to a printing apparatus that transmits an advertising packet.

Description of the Related Art

In recent years, the number of printing apparatuses such as multifunction peripherals or printers each having a Bluetooth® low energy function has been increasing. The printing apparatus having the Bluetooth low energy function transmits data using a Bluetooth low energy advertising packet (hereinafter referred to as a Bluetooth low energy packet) to an external apparatus such as a mobile terminal. Japanese Patent Application Laid-Open No. 2016-152538 discusses a configuration in which a mobile terminal searches for a printing apparatus using Bluetooth low energy and transmits print data to a printing apparatus selected by a user from among search results.

It has been examined whether the Bluetooth low energy packet includes an Internet Protocol (IP) address of a printing apparatus as a use of the Bluetooth low energy packet. For example, in AirPrint® Bluetooth® defined by Apple Inc., it has been defined that a Bluetooth low energy packet includes an IP address. When the Bluetooth low energy packet includes the IP address of a printing apparatus, a mobile terminal in the vicinity of the printing apparatus can easily specify the IP address of the printing apparatus.

The number of IP addresses of the printing apparatus is not necessarily one. In the printing apparatus, both an IPv4 address and an IPv6 address can become available. How to transmit the Bluetooth low energy packet including the IP address when both the IPv4 address and the IPv6 address are available in the printing apparatus has not been assumed.

SUMMARY

According to an aspect of the present disclosure, a printing apparatus that performs wireless communication based on Bluetooth low energy includes a printing unit that performs print processing based on print data, a memory device that stores a set of instructions, and at least one processor that executes the set of instructions to generate, in a case where both an IPv4 address and an IPv6 address are available in the printing apparatus, a Bluetooth low energy advertising packet including the available IPv4 address but not the available IPv6 address, and periodically transmit the generated Bluetooth low energy advertising packet.

According to another aspect of the present disclosure, a printing apparatus that performs wireless communication based on Bluetooth low energy includes a printing unit that performs print processing based on print data, a memory device that stores a set of instructions, and at least one processor that executes the set of instructions to generate, in a case where a setting of the printing apparatus is a first setting to transmit a Bluetooth low energy advertising packet in a first format and both an IPv4 address and an IPv6 address are available in the printing apparatus, a Bluetooth low energy advertising packet including the available IPv4 address but not the available IPv6 address, generate, in a case where the setting of the printing apparatus is a second setting to transmit a Bluetooth low energy advertising packet in a second format, a Bluetooth low energy advertising packet including a MAC address of the printing apparatus, and periodically transmit the generated Bluetooth low energy advertising packet.

Further features will become apparent from the following description of exemplary embodiments with reference to the attached drawings.

BRIEF DESCRIPTION OF THE DRAWINGS

FIG. 1 illustrates a hardware configuration of a printing apparatus.

FIGS. 2A and 2B each illustrate a format of a Bluetooth® Low Energy packet.

FIG. 4 is a flowchart illustrating processing performed by the printing apparatus.

DESCRIPTION OF THE EMBODIMENTS

Figure 3:
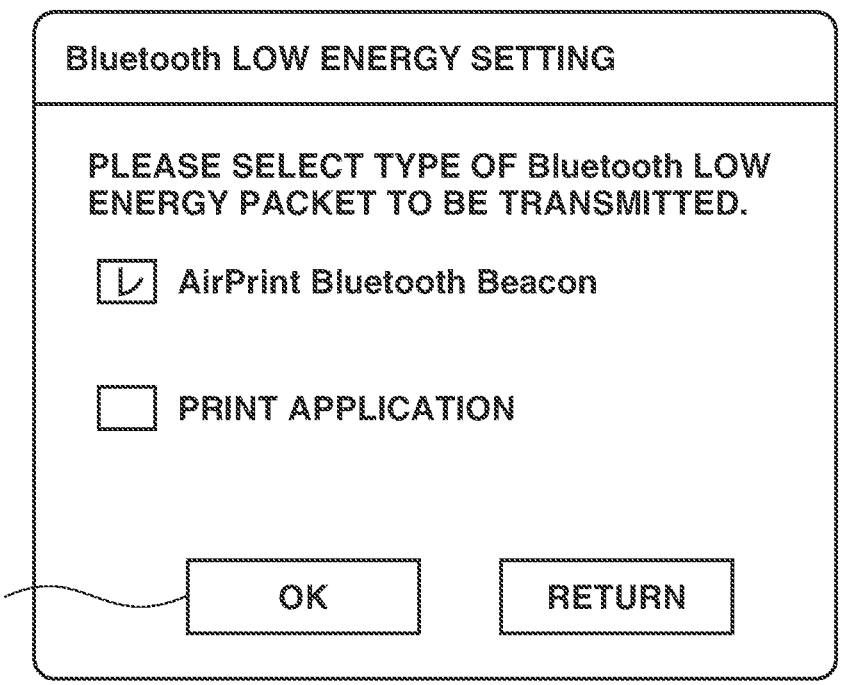
FIG. 3 illustrates a setting screen.

Exemplary embodiments will be described below with reference to the drawings. The below-described exemplary embodiments are not intended to limit the claims and all combinations of features described in the exemplary embodiments are not necessarily essential for a solution.

A hardware configuration of a printing apparatus 100 will be described below with reference to FIG. 1. A central processing unit (CPU) 101 performs various types of processing to control an operation of the printing apparatus 100 by reading out a control program stored in a read-only memory (ROM) 102. The ROM 102 stores the control program. A random access memory (RAM) 103 is used as a main memory of the CPU 101 and a temporary storage area such as a work area. A hard disk drive (HDD) 112 is a nonvolatile storage medium storing various types of data. The printing apparatus 100 can have another configuration in a different embodiment, but still performs each of processes described below. For example, a plurality of CPUs can cooperate with one another to perform each of the processes described below. Some of the processes can be performed using a hardware circuit, such as an Application Specific Integrated Circuit (ASIC).

A printer 109 performs print processing on a sheet based on print data received from an external apparatus via a wireless local area network (LAN) chip 106 or a network interface (I/F) 104. A scanner 110 reads a document placed by a user, and generates a document image. The document image generated by the scanner 110 is printed by the printer 109 (copy processing) or is stored in the HDD 112. An operation unit 111 includes a display with a touch panel function or a keyboard, and displays various types of operation screens. A user can input instructions and information to the printing apparatus 100 via the operation unit 111.

The wireless LAN chip 106 is a chip for performing wireless LAN communication that meets Institute of Electrical and Electronic Engineers (IEEE) 802.11a/b/g/n/ac. A wireless LAN controller 105 controls the wireless LAN communication using the wireless LAN chip 106.

A Bluetooth chip 108 is a wireless communication chip for performing Bluetooth wireless communication. The Bluetooth chip 108 also includes a Bluetooth low energy function and performs Bluetooth low energy communication. The Bluetooth low energy communication includes periodically broadcasting a Bluetooth low energy advertising packet. A Bluetooth controller 107 controls the Bluetooth communication using the Bluetooth chip 108.

The network I/F 104 is connected to a network via a LAN cable. The network I/F 104 communicates with an external apparatus, e.g., a personal computer (PC), on the network to receive print data from the external apparatus and to transmit the document image generated by the scanner 110 to the external apparatus.

The printing apparatus 100 transmits advertising packets in a plurality of formats. In the following description, a Bluetooth low energy advertising packet is referred to as a Bluetooth low energy packet. The plurality of formats includes AirPrint Bluetooth Beacon and a print application. Each of the formats will be described with reference to FIG. 2.

FIG. 2A illustrates an AirPrint Bluetooth Beacon format, which is defined by Apple Inc., and stores data representing connection information, a path, a port number, an IP address, and a transmission radio-field intensity in each field. A Bluetooth low energy packet in the AirPrint Bluetooth Beacon format is used by a PC or a mobile terminal complying with AirPrint®. The PC or the mobile terminal performs device search using a Bluetooth low energy packet in an AirPrint Bluetooth Beacon format. That is, a wireless communication terminal, such as the PC or the mobile terminal, specifies a device complying with AirPrint® based on AirPrint Bluetooth Beacon.

The AirPrint Bluetooth Beacon format includes an IP address of the printing apparatus 100, unlike a print application format described in FIG. 2B. The wireless communication terminal establishes communication based on a communication protocol different from Bluetooth low energy between the printing apparatus 100 and itself using the IP address included in the Bluetooth low energy packet in the AirPrint Bluetooth Beacon format. For example, the wireless communication terminal can perform Wi-Fi® communication with the printing apparatus 100 using the IP address included in the Bluetooth low energy packet.

FIG. 2B illustrates a print application format. A print application is a format defined by a manufacturer of the printing apparatus 100, and is defined to store a transmission radio-field intensity, a Media Access Control (MAC) address, a device name, and a device category in each field. The manufacturer of the printing apparatus 100 provides a print application for a mobile terminal. The user installs the print application on the mobile terminal to use a printing function of the printing apparatus 100. An advertising packet in the print application format is used by the mobile terminal on which the print application is installed. A wireless communication terminal, such as a PC or the mobile terminal, specifies a device corresponding to the print application based on the advertising packet in the print application format.

The print application format includes a MAC address of the printing apparatus 100, unlike the AirPrint Bluetooth Beacon format described in FIG. 2A. The wireless communication terminal establishes communication based on a communication protocol different from Bluetooth low energy between the printing apparatus 100 and itself using the MAC address included in the advertising packet in the print application format. For example, the wireless communication terminal can perform Wi-Fi® communication with the printing apparatus 100 using the MAC address included in the advertising packet.

A setting screen 300 illustrated in FIG. 3 is a screen displayed by the operation unit 111 of the printing apparatus 100. The printing apparatus 100 transmits either the Bluetooth low energy packet in the AirPrint Bluetooth Beacon format or the Bluetooth low energy packet in the print application format. The user sets the format of the Bluetooth low energy packet to be transmitted to the printing apparatus 100 using the setting screen 300.

When the Bluetooth low energy packet in the AirPrint Bluetooth Beacon format is desired to be transmitted to the printing apparatus 100, the user selects "AirPrint Bluetooth Beacon" on the setting screen 300. When the Bluetooth low energy packet in the print application format is desired to be transmitted to the printing apparatus 100, the user selects "PRINT APPLICATION" on the setting screen 300. When the user presses an OK button 301, the printing apparatus 100 stores a result of a setting by the setting screen 300 in the HDD 112 as a device setting.

Processing for transmitting a Bluetooth low energy packet by the printing apparatus 100 according to a first exemplary embodiment will be described with reference to a flowchart of FIG. 4. Steps illustrated in the flowchart of FIG. 4 are processed when the CPU 101 loads the control program stored in the ROM 102 into the RAM 103 and executes the loaded control program. The processing illustrated in the flowchart of FIG. 4 is performed when the printing apparatus 100 is activated or the user has pressed the OK button 301 on the setting screen 300.

In step 401, the CPU 101 specifies a format of a Bluetooth low energy packet to be transmitted. The process is performed by referring to a result of a setting by the setting screen 300. In a case where the format of the Bluetooth low energy packet set as a device setting is AirPrint Bluetooth Beacon, the processing proceeds to step S402. In a case where the format of the Bluetooth low energy packet set as the device setting is a print application, the processing proceeds to step S408.

In step S402, the CPU 101 determines whether both an IPv4 address and an IPv6 address are unavailable. A state where an IP address is unavailable means that the IP address has not been set in the printing apparatus 100. In a case where the CPU 101 determines that both the IPv4 address and the IPv6 address are unavailable (YES in step S402), the processing proceeds to step S407. In a case where the CPU 101 determines that both the IPv4 address and the IPv6 address are not unavailable (NO in step S402), the processing proceeds to step S403. A state where both the IPv4 address and the IPv6 address are not unavailable means that both the IPv4 address and IPv6 address have been set in the printing apparatus 100 or that at least one has been set.

In step S403, the CPU 101 determines whether the IPv4 address is available. A state where an IPv4 address is available means that the IPv4 address has been set in the printing apparatus 100. In a case where the CPU 101 determines that the IPv4 address is available (YES in step S403), the processing proceeds to step S404. In a case where the CPU 101 determines that the IPv4 address is not available (NO in step S403), the processing proceeds to step S405.

In step S404, the CPU 101 generates a Bluetooth low energy packet in an AirPrint Bluetooth Beacon format using the IPv4 address of the printing apparatus 100. The CPU 101 stores the IPv4 address of the printing apparatus 100 in an IP address field in the AirPrint Bluetooth Beacon format described in FIG. 2A, and generates the Bluetooth low energy packet.

The process in step S404 can be performed when both the IPv4 address and the IPv6 address are available in the printing apparatus 100. In this case, the CPU 101 generates the Bluetooth low energy packet in the AirPrint Bluetooth Beacon format using the IPv4 address instead of the IPv6 address. That is, in a case where both the IPv4 address and the IPv6 address are available, the CPU 101 generates a Bluetooth low energy packet including the available IPv4 address from the available IPv4 address and the available IPv6 address. The IPv4 address is selected instead of the IPv6 address because the number of network infrastructure environments corresponding to the IPv6 address is smaller compared to those corresponding to the IPv4 address. In a case where both the IPv4 address and the IPv6 address are available in the printing apparatus 100, the possibility that the Bluetooth low energy packet received by the mobile terminal can be appropriately processed increases when the Bluetooth low energy packet includes the IPv4 address instead of the IPv6 address.

In step S405, the CPU 101 generates a Bluetooth low energy packet in an AirPrint Bluetooth Beacon format using the IPv6 address of the printing apparatus 100. The CPU 101 stores the IPv6 address of the printing apparatus 100 in the IP address field in the AirPrint Bluetooth Beacon format described in FIG. 2A, and generates the Bluetooth low energy packet. The IPv6 address includes a plurality of types of addresses, such as a stateful address, a stateless address, and a link local address. In the printing apparatus 100, a plurality of types of IPv6 addresses can be available. In a case where the plurality of types of IPv6 addresses are available in the printing apparatus 100, the CPU 101 selects the IPv6 addresses based on their respective previously defined priorities. The CPU 101 generates the Bluetooth low energy packet in the AirPrint Bluetooth Beacon format using the selected IPv6 address. As the priorities, for example, the first priority is the stateful address, the second priority is the stateless address, and the third priority is the link local address.

In step S406, the CPU 101 transmits the Bluetooth low energy packet in the AirPrint Bluetooth Beacon format generated in step S404 or S405. The CPU 101 instructs the Bluetooth controller 107 to transmit the Bluetooth low energy packet in the AirPrint Bluetooth Beacon format. The Bluetooth controller 107 controls the Bluetooth chip 108 to transmit the Bluetooth low energy packet in the AirPrint Bluetooth Beacon format. The Bluetooth chip 108 starts to transmit the Bluetooth low energy packet in the AirPrint Bluetooth Beacon format generated in step S404 or S405 in a predetermined period, e.g., at intervals of 100 msec.

The process in step S407 is performed in a case where it is determined, in step S402, that both the IPv4 address and the IPv6 address are unavailable. In step S407, the CPU 101 decides not to transmit a Bluetooth low energy packet in the AirPrint Bluetooth Beacon format. A state where both the IPv4 address and the IPv6 address are unavailable in the printing apparatus 100 means that the IP address to be stored in the Bluetooth low energy packet in the AirPrint Bluetooth Beacon format does not exist. Thus, the CPU 101 determines that the Bluetooth low energy packet in the AirPrint Bluetooth Beacon format is not transmitted so that the Bluetooth low energy packet is not transmitted using the Bluetooth chip 108.

The process in step S408 is performed in a case where the format of the Bluetooth low energy packet set as a device setting has been specified as a print application in step S401. In step S408, the CPU 101 generates a Bluetooth low energy packet in a print application format using a MAC address of the printing apparatus 100. The CPU 101 stores the MAC address of the printing apparatus 100 in a MAC address field in the print application format described in FIG. 2B, and generates the Bluetooth low energy packet.

In step S409, the CPU 101 transmits the Bluetooth low energy packet in the print application format generated in step S408. The CPU 101 instructs the Bluetooth controller 107 to transmit the Bluetooth low energy packet in the print application format. The Bluetooth controller 107 controls the Bluetooth chip 108 to transmit the Bluetooth low energy packet in the print application format. The Bluetooth chip 108 starts to transmit the Bluetooth low energy packet in the print application format generated in step S408 in a predetermined period, e.g., at intervals of 30 msec. As described in FIG. 2B, the IP address of the printing apparatus 100 is not stored in the Bluetooth low energy packet in the print application format. Therefore, in a case where both the IPv4 address and the IPv6 address are unavailable in the printing apparatus 100, the printing apparatus 100 transmits the Bluetooth low energy packet in the print application format.

As described above, the printing apparatus 100 generates the Bluetooth low energy packet in the AirPrint Bluetooth Beacon format using the IPv4 address instead of the IPv6 address in a case where both the IPv4 address and the IPv6 address are available. The printing apparatus 100 can appropriately transmit the Bluetooth low energy packet in the AirPrint Bluetooth Beacon format even when both the IPv4 address and the IPv6 address are available.

The printing apparatus 100 does not transmit the Bluetooth low energy packet in the AirPrint Bluetooth Beacon format in a case where both the IPv4 address and the IPv6 address are unavailable, i.e., have not been set.

In the above-described exemplary embodiment, an example of a condition that the Bluetooth low energy packet in the AirPrint Bluetooth Beacon format is not transmitted is the condition that both the IPv4 address and the IPv6 address are unavailable in the printing apparatus 100. However, the condition that the Bluetooth low energy packet in the AirPrint Bluetooth Beacon format is not transmitted is not limited to this situation.

In a second exemplary embodiment, when a printing apparatus 100 is not connected to an infrastructure network, a Bluetooth low energy packet in the AirPrint Bluetooth Beacon format may not be transmitted. A case where the printing apparatus 100 is not connected to the infrastructure network, if for example, when a LAN cable disconnects from the network I/F 104 or the wireless LAN chip 106 is not connected to an access point. For example, in a case where a mobile terminal, which has received the Bluetooth low energy packet in the AirPrint Bluetooth Beacon format, transmits print data to the printing apparatus 100 with an IP address included in the Bluetooth low energy packet as a destination and the printing apparatus 100 is not connected to the infrastructure network, that the print data does not reach the printing apparatus 100. In such a case, the mobile terminal uselessly receives the Bluetooth low energy packet from the printing apparatus 100, which the print data does not reach. Occurrence of such a situation can be prevented when the printing apparatus 100 does not transmit the Bluetooth low energy packet in the AirPrint Bluetooth Beacon format if the printing apparatus 100 is not connected to the infrastructure network.

As another example, when an available IP address is only a link local address in the printing apparatus 100, a Bluetooth low energy packet in the AirPrint Bluetooth Beacon format may not be transmitted. The Bluetooth low energy packet in the AirPrint Bluetooth Beacon format assumes a situation where it is used by a PC or a mobile terminal belonging to a subnet different from a subnet to which the printing apparatus 100 belongs. The link local address is an IP address available only within a subnet to which the printing apparatus 100 belongs, and contradicts a use of the Bluetooth low energy packet in the AirPrint Bluetooth Beacon format. In a case where the available IP address is only the link local address in the printing apparatus 100, the Bluetooth low energy packet in the AirPrint Bluetooth Beacon format may not be transmitted.

As still another example, when an IP filter setting of the printing apparatus 100 is a setting to reject connection from a different subnet, a Bluetooth low energy packet in the AirPrint Bluetooth Beacon format may not be transmitted. The Bluetooth low energy packet in the AirPrint Bluetooth Beacon format assumes a situation where it is used by a PC or a mobile terminal belonging to a subnet different from a subnet to which the printing apparatus 100 belongs. A case where the IP filter setting of the printing apparatus 100 is a setting to reject connection from a different subnet contradicts a use of the Bluetooth low energy packet in the AirPrint Bluetooth Beacon format. In a case where the IP filter setting of the printing apparatus 100 is the setting to reject connection from a different subnet, the Bluetooth low energy packet in the AirPrint Bluetooth Beacon format may not be transmitted.

According to the above-described first or second exemplary embodiment, the printing apparatus can appropriately transmit the Bluetooth low energy packet including the IP address even when both the IPv4 address and the IPv6 address are available in the printing apparatus.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

What is claimed is:

1. A device to which both of IPv4 and IPv6 are assignable, the device comprising:
    at least one memory device that stores a set of instructions; and at least one processor that executes the set of instructions, the instructions, when executed, causing the device to perform operations comprising:
    in a case where a plurality of types of IPv6 addresses and an IPv4 address are assigned to the device as a plurality of IP addresses, transmitting, a Bluetooth packet including the IPv4 address assigned to the device but not including the plurality of types of IPv6 addresses assigned to the device,
    wherein at least one external apparatus having received the Bluetooth packet including the transmitted IPv4 address searches for the device.

2. The device according to claim 1, wherein the Bluetooth packet is a Bluetooth low energy advertising packet.

3. The device according to claim 2, wherein the device is a printer and the transmitted Bluetooth low energy advertising packet is a Bluetooth Beacon packet that satisfies a predetermined format to be used for searching for a printer of AirPrint®.

4. The device according to claim 3,
    wherein the operations further comprise:
    setting whether to transmit the Bluetooth Beacon packet to be used for searching for the printer of AirPrint®,
    wherein the Bluetooth low energy advertising packet is transmitted in a case where it is set to transmit the Bluetooth Beacon packet to be used for searching for the printer of AirPrint®, and
    wherein the Bluetooth low energy advertising packet is not transmitted in a case where it is set not to transmit the Bluetooth Beacon packet to be used for searching for the printer of AirPrint®.

5. The device according to claim 1, wherein the device is a scanner device.

6. The device according to claim 1, wherein in a case where a plurality of types of IPv6 addresses is assigned to the device as the plurality of IP addresses, one IPv6 address from among the plurality of IP addresses is selected.

7. The device according to claim 6, wherein in a case where a stateful IPv6 address is included in the plurality of types of IPv6 addresses are assigned to the device, the stateful IPv6 address is selected.

8. A device to which both of IPv4 and IPv6 are assignable, the device comprising:
    at least one memory device that stores a set of instructions; and
    at least one processor that executes the set of instructions, the instructions, when executed, causing the device to perform operations comprising:

in a case where a plurality of types of IPv6 addresses and an IPv4 address are assigned to the device as a plurality of IP addresses, transmitting, a Bluetooth packet including the IPv4 address assigned to the device but not including the plurality of types of IPv6 addresses assigned to the device; and receiving print data for which the IPv4 address included in the transmitted Bluetooth packet is set as an address from at least one external apparatus having received the transmitted Bluetooth packet.

9. The device according to claim 8,
wherein the Bluetooth packet is a Bluetooth low energy advertising packet.

10. The device according to claim 9,
wherein the device is a printer and the transmitted Bluetooth low energy advertising packet is a Bluetooth Beacon packet that satisfies a predetermined format to be used for searching for a printer of AirPrint®.

11. The device according to claim 10,
wherein the operations further comprise:
setting whether to transmit the Bluetooth Beacon packet to be used for searching for the printer of AirPrint®,
wherein the Bluetooth low energy advertising packet is transmitted in a case where it is set to transmit the Bluetooth Beacon packet to be used for searching for the printer of AirPrint®, and
wherein the Bluetooth low energy advertising packet is not transmitted in a case where it is set not to transmit the Bluetooth Beacon packet to be used for searching for the printer of AirPrint®.

12. The device according to claim 8,
wherein the device is a scanner device.

13. The device according to claim 8,
wherein in a case where a plurality of types of IPv6 addresses is assigned to the device as the plurality of IP addresses, one IPv6 address from among the plurality IP addresses is selected.

14. The device according to claim 13,
wherein in a case where a stateful IPv6 address is included in the plurality of types of IPv6 addresses are assigned to the device, the stateful IPv6 address is selected.

15. A control method of controlling a system including a device to which both of IPv4 and IPv6 are assignable and an external apparatus, the method comprising:

in a case where a plurality of types of IPv6 addresses and an IPv4 address are assigned to the device as a plurality of IP addresses, transmitting, a Bluetooth packet including the IPv4 address assigned to the device but not including the plurality of types of IPv6 addresses assigned to the device, and the external apparatus comprising:

at least one memory device that stores a set of instructions; and at least one processor that executes the set of instructions, the instructions, when executed, causing the external apparatus to perform operations comprising:

receiving the Bluetooth packet, and searching for the device which has transmitted the Bluetooth packet after receiving the Bluetooth packet.

16. The device according to claim 1, wherein at least one external apparatus having received the transmitted Bluetooth packet searches for the device, using the Bluetooth packet including the IPv4 address.

17. The device according to claim 1, wherein the device performs IP communication with the at least one external apparatus that has received the transmitted Bluetooth packet, using the IPv4 address.

18. The device according to claim 1, wherein in a case where the IPv4 address is available, the IPv4 is selected.

* * * * *